United States Patent [19]

Pickett et al.

[11] Patent Number: 5,062,147
[45] Date of Patent: Oct. 29, 1991

[54] USER PROGRAMMABLE COMPUTER MONITORING SYSTEM

[75] Inventors: Thomas Pickett, Westerville, Ohio; Bjorn Larson, Ontario, Canada

[73] Assignee: Votek Systems Inc., Worthington, Ohio

[21] Appl. No.: 529,710

[22] Filed: May 30, 1990

Related U.S. Application Data

[63] Continuation of Ser. No. 43,595, Apr. 27, 1987, abandoned.

[51] Int. Cl.⁵ .................................... G06F 11/30
[52] U.S. Cl. ........................... 364/900; 364/921.9; 364/944.9
[58] Field of Search ... 364/200 MS File, 900 MS File, 364/188

[56] References Cited

U.S. PATENT DOCUMENTS

| | | | |
|---|---|---|---|
| 4,255,618 | 3/1981 | Danner et al. | 179/1 B |
| 4,367,525 | 1/1983 | Brown et al. | 364/200 |
| 4,434,460 | 2/1984 | Drakenborn et al. | 364/900 |
| 4,455,551 | 6/1984 | Lemelson | 340/539 |
| 4,479,123 | 10/1984 | Loskorn et al. | 340/825.06 |
| 4,519,027 | 5/1985 | Vogelsberg | 364/185 |
| 4,560,978 | 12/1985 | Lemelson | 340/539 |
| 4,567,557 | 1/1986 | Burns | 364/185 |
| 4,578,555 | 3/1986 | Inoue | 219/695 |
| 4,581,757 | 4/1986 | Cox | 381/51 |
| 4,588,987 | 5/1986 | Stephens | 340/525 |
| 4,622,538 | 11/1986 | Whynacht et al. | 340/586 |
| 4,628,437 | 12/1986 | Poschmann et al. | 364/900 |
| 4,630,110 | 12/1986 | Cotton et al. | 358/108 |
| 4,644,478 | 2/1987 | Stephens et al. | 364/188 |
| 4,653,100 | 3/1987 | Barnett et al. | 381/52 |
| 4,792,888 | 12/1988 | Agarwal et al. | 364/188 |
| 4,815,014 | 3/1989 | Lipner et al. | 364/188 |
| 4,816,208 | 3/1989 | Woods et al. | 364/188 |

OTHER PUBLICATIONS

Pickett–"Developing Multi-Channel Voice Applications Under DOS", Speech Tech '86 Conference Proceedings.

"Advances in Voice Technology-Making Computers People Literate", Feb. 1986–Senescan.

*Primary Examiner*—Stuart N. Hecker
*Assistant Examiner*—Rebecca L. Rudolph
*Attorney, Agent, or Firm*—Watts, Hoffmann, Fisher & Heinke Co.

[57] ABSTRACT

A computer monitoring system. A serial message from a computer is received and analyzed in a user definable manner. This analysis causes one or more monitoring system activities to occur. These activities include a logging of the message, display of the message, announcement over a loudspeaker, and the placing of a telephone call to one or more people.

22 Claims, 11 Drawing Sheets

MESSAGE ACTION DEFINITION

DEFINITION /110

KEY  SEQ#  FILE  KEYSPEC  OOPS  LIMIT

DESCRIPTION

ACTION /112

TALLY  VALUE  IF

THEN MESSAGE TYPE  MESG COLOR

DRAW COLOR

SAY

ON SPEAKER?  REPEAT (secs)

DELAY  ACKD REPEAT

CALL AFTER  GROUP

NEXT
ELSE

FIG. 8

SYSTEM STATUS RECORD

MAIN KEY    ALT. KEY    TYP

DESCRIPTION

T    DESCRIPTION    COUNT    LIMIT    FORCE    CONDITION ID

A    0>
L    1>
L    2>
Y    3>

PLAY

RECORD

FIG. 9

DEVICE CONTROL TABLE

DEVICE (node,cpu,1dev):

DEVICE DESCRIPTION:

FIG. 10

VOICE LIBRARY MAINTENANCE

LIBRARY MEMBER: ☐

MEMBER DESCRIPTION: ☐
☐

FUNCTION:   PLAY

RECORD

FIG. 11

DIAGRAM DEFINITION FILE

| MAIN KEY | SEQ# | TYPE | COLOUR | FROM | | | TO | | |
|---|---|---|---|---|---|---|---|---|---|
| | | | | ROW | COL | ENDPT | ROW | COL | ENDPT |

COMMENT/LABEL TEXT

FIG. 12

OPERATOR IDENTIFICATION

PERSON ID
OPERATOR TYPE
SECURITY CODE
NAME: FIRST
INITIAL
LAST

FIG. 13

NOTIFICATION GROUP

GROUP   PERSON   ALT   DAY   FROM   TO   PHONE NUMBER

FIG. 14

MESSAGE ACTION DEFINITION

DEFINITION

KEY: TMN040
SEQ#: 010
FILE: S
KEYSPEC: [19,+3][`PROCESSOR`+10,+1]
]
OOPS: RET
LIMIT:

DESCRIPTION: MARK CPU DOWN

ACTION

TALLY: 0 +
VALUE: 1

IF: >
THEN MESSAGE TYPE: Y    MESG COLOR: R
                        DRAW COLOR: FR
SAY: `PROCESSOR`;[`PROCESSOR`+10,+1];`ON
     SYSTEM`;[19,+2];`IS DOWN`;

ON SPEAKER? Y   REPEAT (secs): 30
DELAY: 0        ACKD REPEAT:
CALL AFTER:     GROUP:

NEXT: 020
ELSE: END

FIG.15

MESSAGE ACTION DEFINITION

DEFINITION — 110

| KEY | SEQ# | FILE | KEYSPEC | OOPS | LIMIT |
|---|---|---|---|---|---|
| TMN040 | 020 | S | '#CPUS-DOWN' | | |

DESCRIPTION: IF 2 OR MORE CPUS CALL SOMEONE

ACTION — 112

TALLY: 0 +
VALUE: 1

IF >
THEN MESSAGE TYPE: Y    MESG COLOR: 
                        DRAW COLOR: FR
SAY: 'WARNING','TWO CPUS DOWN'

ON SPEAKER? Y    REPEAT (secs): 30
DELAY: 0    ACKD REPEAT: 
CALL AFTER: 1    GROUP: OPERATIONS

NEXT: LOG
ELSE: LOG

SYSTEM STATUS RECORD

MAIN KEY: 001,03
ALT. KEY:
TYP:

DESCRIPTION: PROCESSOR 3 SYSTEM 1

TALLY

| T | | DESCRIPTION | COUNT | LIMIT | FORCE | CONDITION ID |
|---|---|---|---|---|---|---|
| A | 0> | DOWN COUNT | 0 | 1 | ☐ | |
| L | 1> | | | | ☐ | |
| L | 2> | | | | ☐ | |
| Y | 3> | | | | ☐ | |

PLAY
RECORD

FIG.18

SYSTEM STATUS RECORD

MAIN KEY: #CPUS-DOWN
ALT. KEY:
TYP:

DESCRIPTION: COUNT OF CPUS DOWN

| T | | DESCRIPTION | COUNT | LIMIT | FORCE | CONDITION ID |
|---|---|---|---|---|---|---|
| A | 0> | DOWN COUNT | 0 | 2 | ☐ | |
| L | 1> | | | | ☐ | |
| L | 2> | | | | ☐ | |
| Y | 3> | | | | ☐ | |

PLAY
RECORD

USER PROGRAMMABLE COMPUTER MONITORING SYSTEM

This is a continuation of co-pending application Ser. No. 07/043,595 filed on 04/27/87, now abandoned.

DESCRIPTION

1. Technical Field

The present invention relates to a computer monitoring system particularly suited for sensing faults and categorizing those faults in a user definable manner.

2. Background Art

Computer installations often represent millions of dollars of investment and attend to the data processing needs of thousands of people each day. A dollar figure cannot easily be placed on the damage done when such computer systems malfunction. To ensure that data processing operations continue even in the event of a failure, many computer operations include back-up systems that are automatically brought on-line in the event of a problem with the primary system. The banking, insurance, and health industry fields all use redundancies to protect the integrity of their data processing. As the need to access and utilize information increases, the use of such safeguards to avoid catastrophic data processing failure will also increase.

To assist computer operations staff in identifying failures, the computer industry has developed tools in both hardware and software to alarm or alert a user regarding specific failures. These prior art techniques for monitoring computers and data processing operations fail, however, to address a basic unresolved problem, how to ensure the data processing staff takes appropriate action once the failure has been sensed or identified.

Different data processing problems require different responses. Some malfunctions are non-critical and can be allowed to accumulate until a certain number have occurred. Other problems require immediate response by one or more people to avoid catastrophic system failure. These problems cannot be simply categorized and stored for later review, but instead must be immediately addressed.

Unfortunately, the traditional method of problem detection, tracking, and resolution is still in the hands of the computer operator The computer operator's attention and fault response capabilities may not be adequate to ensure system reliability. By monitoring and reading a standard computer console, for example on a CRT screen, the operator is assumed to immediately detect important faults when they occur and initiate action to correct those faults. This expectation regarding operator attention and decision making ability is unrealistic.

DISCLOSURE OF THE INVENTION

The present invention relates to a computer monitoring system that addresses the aforementioned data processing problems in a number of ways. The invention has a capability to monitor or screen messages received from other computers and filter those messages according to a predetermined rules system defined by the computer operations management staff. It is therefore up to the data processing manager, and not the computer operator to categorize the severity of malfunctions and determine which problems need immediate attention and which faults can be merely stored for later review and correction.

A second important feature of the invention is the ability to detect messages from a computer and call the attention of one or more individuals to those messages Specifically, audible messages can be transmitted over a public address system, images can be drawn on a viewing screen in a way intended to draw the user's attention to the problem, or in certain instances one or more individuals are contacted by telephone to make the problem known to others.

The computer monitoring system of the invention includes a controller having a communications interface for receiving computer generated communications messages. These messages typically conform to a protocol designed by the computer manufacturer or software vendor and contain data organized in many different ways.

The invention also includes a mechanism for interpreting each of the messages and categorizing those messages based upon a user defined classification criteria. This feature of the system allows the data processing manager to control how the monitoring system functions. The monitoring system is adaptable to interface different computer systems using different message protocols.

The messages that are received can be stored for later review but also can initiate a status alert function to apprise one or more users that a particular message has been received and attention is needed. The status alert mechanism includes a voice processor for generating an audible warning message that can be delivered over a speaker system. In addition, a visual display is included to provide a visual warning that a particular message has been received. Finally, a communications system transmits voice warning messages to a remote site on a communications path, to assure the computer operator is not the only person that is aware of the problem.

The computer operator's job is simplified since he or she no longer needs to scan many messages received from the monitored computer and attempt to pick from these messages the important ones that need attention. The monitoring system automatically performs this function and awaits an acknowledgment by the computer operator. In one embodiment of the invention the computer monitoring system includes a personal computer that communicates with the data processing system by a communications link. Messages are received on this communications link and analyzed by the personal computer in a manner specified by the data processing manager. Particular messages are deemed to be very important and require one level of response. Other messages are less critical and can be dealt with in a less drastic fashion. Finally, routine messages not necessarily indicative of a problem can be categorized and stored for later review. Those messages which are not recognized by the personal computer are assumed to be non-critical and receive no action.

By way of a specific example, if a certain threshold number of central processing units in a computer installation have failed, it is imperative that action be taken to restore one or more of these failed central processing units. The invention envisions the announcement of this failure to the operations staff both visually and orally as well as contact of one or more individuals by telephone. These individuals could include the manager of data processing as well as engineering staff relied upon to service the computer operations.

The structure of the invention includes a number of features which will become better understood from a detailed description of one embodiment of the invention. These features include techniques for ensuring security, programming of message analysis, timing and counting facilities, as well as control over the mechanism for data communications and voice communications.

From the above it is appreciated that one object of the invention is a computer monitoring method and apparatus for analyzing messages received from one or more computers and taking appropriate action based upon the content of those messages. This and other objects, advantages, and features of the invention will become better understood from a detailed description of a preferred embodiment of the invention which is described in conjunction with the accompanying drawings.

BRIEF DESCRIPTION OF THE DRAWINGS

FIGS. 7-14 depict prompt screens to facilitate operator programming of the FIG. 1 monitoring system; and FIGS. 15-18 represent screens showing message processing data organized in message action and status record files after that data has been entered.

BEST MODE FOR CARRYING OUT INVENTION

Figure 1:
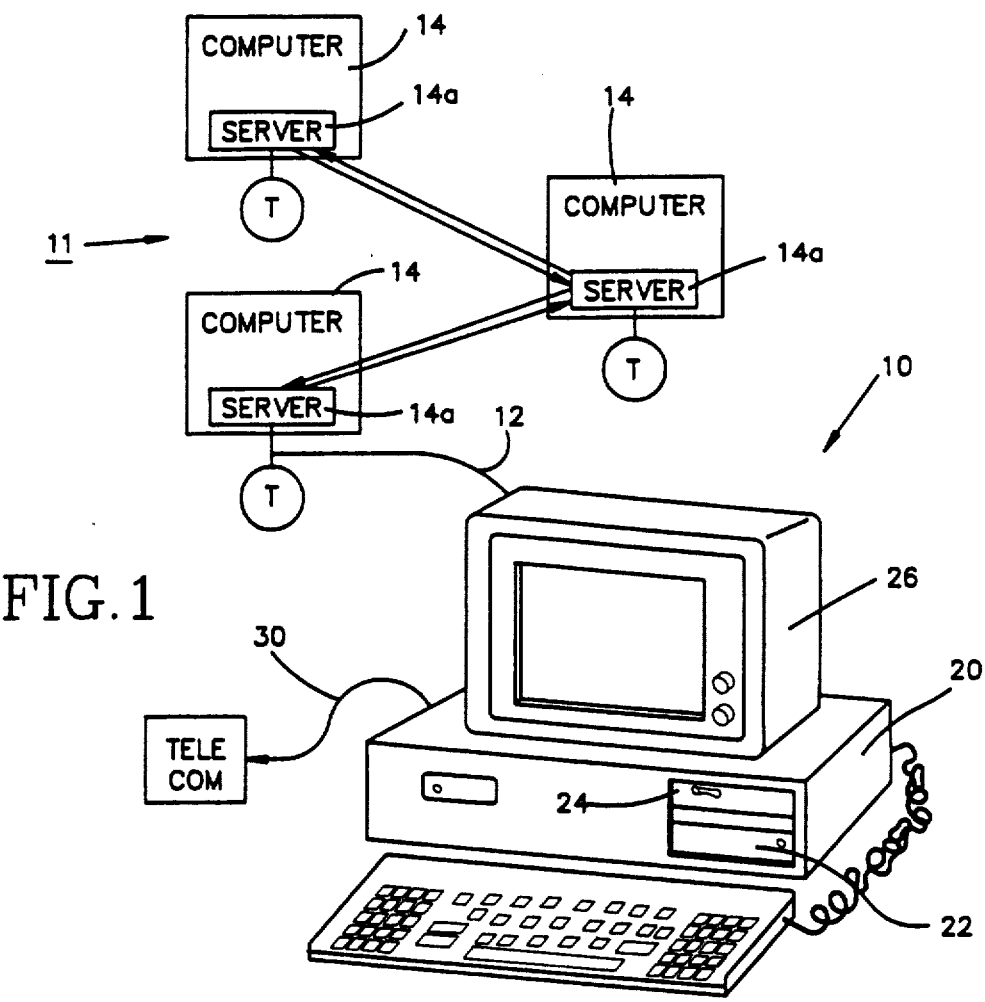
FIG. 1 is a schematic representation of a computer monitoring system.

Turning now to the drawings, FIG. 1 schematically depicts a computer monitoring system 10 constructed in accordance with the invention monitoring messages or signals received along a data communications path 12 coupled to a data processing system 11 having multiple computers 14.

The computers 14 depicted in FIG. 1 are mainframe computers having file servers 14a for communicating between computers 14. Each computer 14 supports a plurality of terminals T and in the FIG. 1 embodiment the message processing system 10 comprises one such terminal.

Alternate communications configurations are anticipated. Particularly, a dedicated communications path between a single computer and a computer monitoring system 10 is possible An alternate embodiment of the invention utilizes a modem that interfaces the monitoring system 10 and is accessible via telecommunications signals transmitted from off site computers. In this embodiment of the invention, the monitoring system 10 has a dedicated telephone line and phone number which can be called by computers which are programmed to communicate status information to the monitoring system 10.

Regardless of the communications link to the monitoring system 10, the essence of the invention is in monitoring status signals from a computer and taking action based upon a user definable criteria in response to receipt of a message. This response takes a number of possible forms varying from the updating of a status record internal to the monitoring system to the placing of a telephone call to an off site user.

Hardware

The preferred monitoring system is based on an IBM PC/AT or compatible microcomputer 20 having at least 512 kilobytes of main memory, a 20 megabyte or larger fixed disk 22, a high density floppy diskette drive 24, a color monitor 26, two asynchronous communications ports (designated "COM 1" and "COM 2"), and a battery powered clock.

Installed in one or more of the expansion slots of the IBM or equivalent computer are voice cards having an attached loudspeaker, microphone, and telephone communication cable 30 connected to a conventional RJ-11 telephone plug. A minimum monitoring system configuration utilizes one voice card but the utilization of multiple voice cards allows loudspeaker announcements and telephone transmission to h=conducted simultaneously.

Software

The monitoring system 10 utilizes multi-tasking software running on DOS 2.1 or later to perform a number of functions in what appears to be a simultaneous manner. A preferred system 10 incorporates voice boards in the microcomputer expansion slots commercially available from Votan under the designation VPC-2000. A description of utilization of these voice boards in a multitasking voice mail application is presented in a paper entitled "Developing Multi-Channel Voice Applications Under DOS" by Pickett presented at SpeechTech '86 and published by Media Dimensions. This paper is incorporated herein by reference and referred to hereafter as "Voice Applications."

The multitasking software comprises three C language modules that are compiled separately and linked together as executable code. One module handles communications between the microcomputer and the VOTAN voice boards, a second module includes routines used in creating user friendly screen interfaces (windows) and other high level functions (graphics for example) not supported by the standard "C" language. The third module implements a multitasking computer monitoring application described below.

Figure 2:
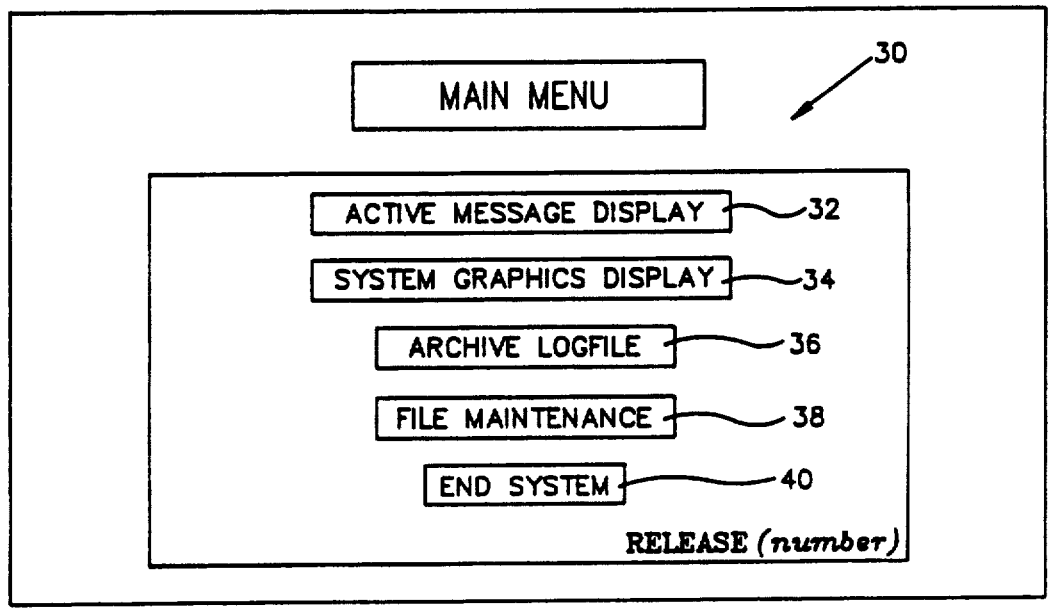
FIG. 2 is a depiction of a video screen for prompting interaction with the FIG. 1 computer monitoring system.

Turning to FIG. 2, the user is presented with a main menu screen 30 (FIG. 2) which prompts the user to interact with the monitoring system 10 in one of a number of ways. Until the user enters a valid password, however, none of these options can be chosen.

Figure 3:
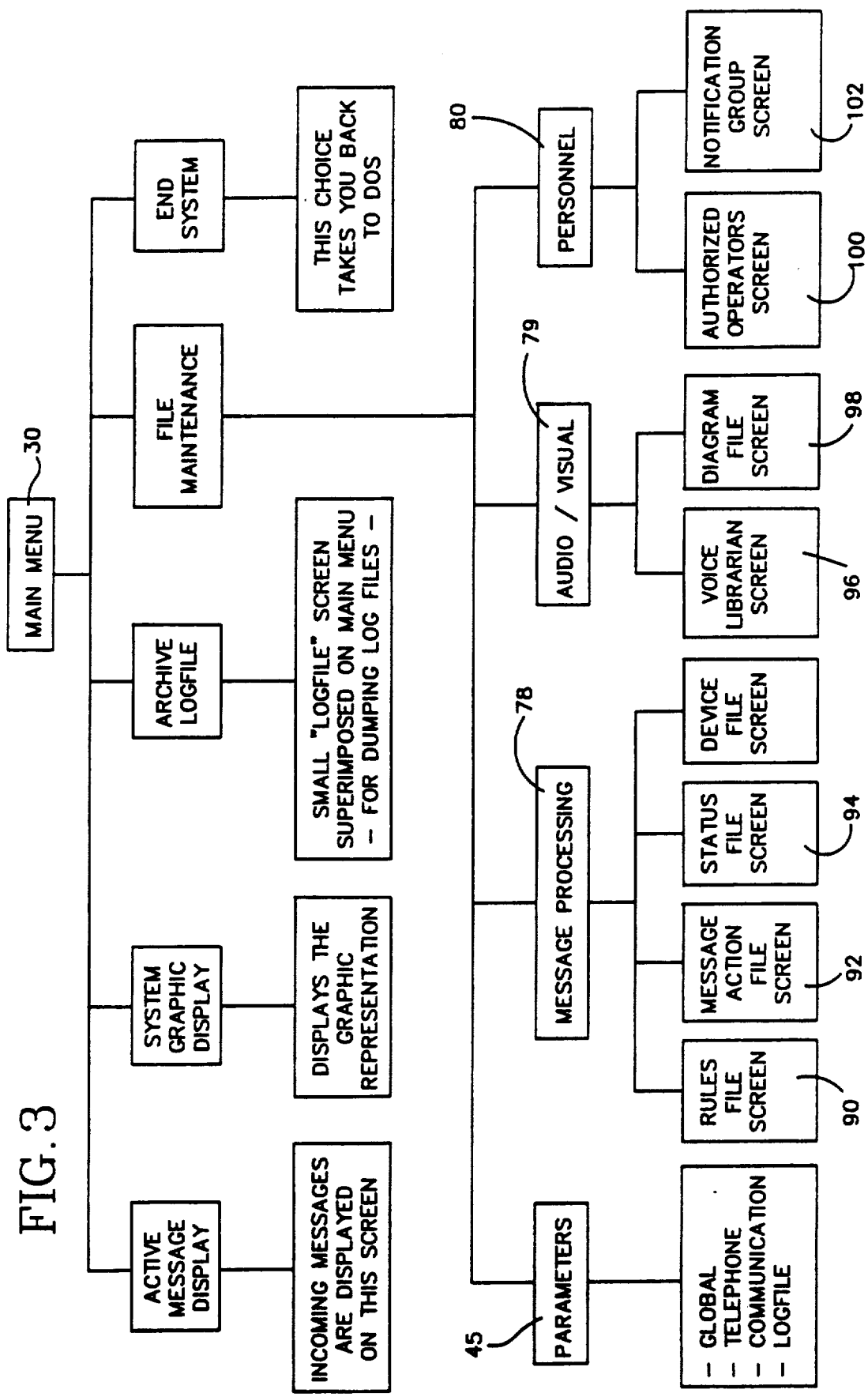
FIG. 3 is a depiction of user available options accessible from the FIG. 2 prompt screen.

The user can observe the status of the system by choosing a first prompt 32 which causes the system 10 to display a text listing of messages which reflect situations still needing attention received from one or more computers. Choice of a graphics display prompt 34 causes the system to display a graphics screen indicating the configuration of the computer system 11. The user can also select a prompt 36 which causes the system to archive information from the monitoring system 10. Choice of a file maintenance prompt 38 allows the user to interact with a number of records which are stored on disk and control the way the system 10 responds to computer generated messages A final prompt 40 causes the system 10 to return to DOS. The results of these choices are shown in FIG. 3. The file maintenance option 38 is discussed in detail below.

Multi-Tasking in the Computer Monitoring Environment

At its highest level, the microcomputer 20 executes a control program implementing a multi-tasking system wherein the system resources of the microcomputer 20 are shared amongst a number of processes. In the disclosed and preferred embodiment of the invention there are nine (9) processes that obtain control of the system. Four of these processes (0-3) are associated with four voice boards mounted in the computer expansion slots. These processes control the placing of telephone calls, the accessing of data from a voice library, and the announcement of information over a loudspeaker.

A communications process (4) monitors receipt of messages from the computers 14 over the communications path 12 as well as analyzing those messages for information content.

An archiving process (5) is responsible for logging information maintained on the fixed disk 22 by the microcomputer 20 to an alternate media such as a floppy disk. This archiving function 36 (FIG. 2) takes place under user control in response to a user keyboard input.

A screen control process (6) is responsible for updating a graphics display created by the user which depicts the computer configuration and status. The screen process also updates the active message display which is a text display that can be scrolled up and down by the user to review messages generated by the computers 14 that are stored by the microcomputer 20.

A timer process (7) is responsible for keeping track of the date and time and is utilized in performing time related functions by the monitoring system 10. The computer 20 can begin monitoring messages after a certain time and/or make announcements at a certain time to initiate operator interaction. This might by desirable, for example in prompting the user to initiate the running of a particular job at a particular time.

A file maintenance process (8) allows the user to access file records that define the way messages are monitored. Much of the remaining disclosure focuses on this process The multi-process environment closes files and returns the system to its disk operating system (DOS) by a mechanism defined in the "Voice Applications" reference.

These nine processes are arbitrated in a round-robin fashion wherein each process is offered time on the system. If a particular process does not require access to the system, that process immediately relinquishes control back to a process which does place demands on the system at that particular time. Thus, for example, the system-close process is offered an opportunity to return to DOS at periodic intervals, but unless the system operator has initiated that process via the keyboard, the close (−1) process does not take control of the computer 20.

The multi-tasking implementation is accomplished by a number of sub-routines, each of which periodically checks a status indicator used in signaling that particular process whether or not it should take control of the microcomputer 20. This is accomplished with a PP__. wait () function incorporated into the sub-routine. Further details of implementation of the multi-tasking of multiple processes are found in the "Voice Applications" publication.

Since the nine processes summarized above are all taking place in what appears to be simultaneous fashion, the user can reprogram or reconfigure the monitoring system 10 while messages are being received and analyzed. These services are available to supervisory personnel by entering the "File Maintenance" option 38 from the main menu (FIG. 2). The steps in customizing the monitoring system 10 are referred to as administrative/supervisory services. These services present a user friendly interface between the computer operator and the microcomputer 20. This interface is accomplished using the abovementioned series of modules written in "C" that facilitate the creation of windows and graphics for prompting user interaction with the microcomputer.

Through this interaction, a user can add or modify persons targeted for telephone contact, change passwords assigned to different operators, and modify status of those operators. These tasks can only be accomplished by operators the computer 20 recognizes as supervisory personnel.

The administrative services allow supervisory personnel to adjust the communications parameters 45 (FIG. 6) the microcomputer 20 uses in interacting with the other computers 14, the one or more voice boards mounted in the microcomputer, and data that is logged to archive the system. These parameters are organized in four parameter files 41, 42, 43, 44 listed in FIG. 6.

Additional tasks that can be performed via the administrative screens presented to the user are modification of a status file indicating the status of the system, modification of a voice library containing messages to be transmitted by the voice boards, modification of the rules file which filters the received messages, and modification of message action files which are addressed based upon the filtering activities of the rules file. Each of these four user definable files are organized into a plurality of records which are accessed by a key.

Devices

An entity or device is some "thing" which the system 10 monitors and stores information about in one of its status records. A set of files manages the entities or devices it knows about. A "device" can be a physical device such as CPU, a tape drive, printer, communication line or disk drive. In addition, a device can be an entity such as a job name, or a path to a disk drive, or a quantity of resource-such as spool space or available disk space. Finally, an entity can represent a collection of resources—such as a set of processors, a logical device consisting of several paths, and so forth. Entities do not have to "exist" as real devices in order to be monitored.

Message Processing Overview

Messages generated by the one or more computers 14 and the analysis of these messages form the heart of the monitoring system 10. Messages are received by the monitoring system 10 on the communications path 12 and are analyzed to determine what action, if any, should be taken by the monitoring system 10. The communications messages are generated by the host computers 14 and must conform to an ASCII standard so they can be processed by the microcomputer 20. By way of example, Tandem computer operating systems include a program designated $AOPR for sending and receiving messages. The microcomputer "COM 1" port receives messages and the "COM 2" port sends messages back to the computers 14.

An asynchronous interrupt driven communications handler processes all messages regardless of which of the 9 processes has control of the microcomputer. The communication speeds are adjusted to values between 300 and 9600 baud (see FIG. 6 Communications Parameters). If a different process (the logging of data for archival purposes, for example) has control of the microcomputer when a message is received, the message is stored in a memory buffer until the communications processing process (4) again takes over the system. The different processes are all programmed to enter wait states at regular intervals. No process, for example, has control over the system for more than on the order of a millisecond at a time.

Each time the communications process (4) takes control of the system 20, it examines a pointer to the last message received at the communications port (COM 1) and compares that pointer to the pointer of a last message that was analyzed by the communications process. If the two pointers are the same, the communications process has analyzed all received messages and gives back processing time to other processes conducted in the multi-tasking environment.

If the pointers are not identical, a message has been received that must be analyzed for its content to determine what action, if any, needs to be taken by the microcomputer 20.

Figure 4:
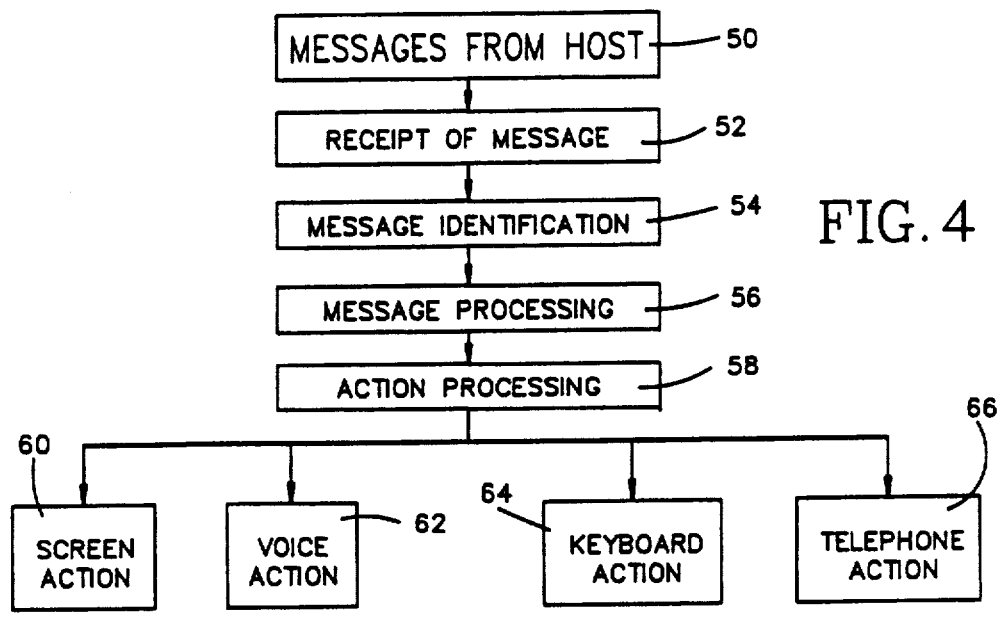
FIGS. 4 and 5 are flow charts summarizing the message processing capabilities of the computer monitoring system.

Since the process of examining message content is central to the operation of the monitoring system 10, this process will be discussed in some detail. Each incoming message is processed in turn in accordance with an algorithm summarized in the flow charts depicted in FIGS. 4 and 5. FIG. 4 summarizes the steps of a host or main computer 14 generating 50 a message and transmitting that message to the monitoring system 10. The monitoring system 10 receives 52 the message and stores it in a memory buffer regardless of what process is at that time taking place. When the communications process in the multi-tasking environment takes control of the microcomputer 20, it first identifies 54 the received message and then processes 56 this message in accordance with a message processing routine forming part of the communications process. As messages are processed 56, certain ones of those messages will initiate an action 58 by the microcomputer 20. The action possibilities are updating a screen 60, making an announcement over a loudspeaker 62, awaiting acknowledgment by a user 64, and sending a message 66 by a telephone communications output incorporated in one of the voice boards.

Messages can also be generated internally by the microcomputer 20. These messages also are processed in turn in accordance with the message processing capabilities defined in FIG. 4.

To better understand the message processing capabilities of the system 10, a specific example will be utilized in the remaining discussion. This example is of a multicomputer system having multiple central processing units (CPUs). These multiple CPUs form backups so that more than one central processing unit must fail before a critical failure mode is experienced. As a first central processing unit fails, this information is presented to a computer operator for acknowledgment and a Status File is updated indicating that a single central processing unit has failed. For illustration purposes it is assumed that when two or more central processing units have failed, it is imperative that the operator not merely acknowledge the receipt of this message, but that the operator also take steps to remedy the situation. The monitoring system 10 is programmed by the computer operations management to respond to the failure of two or more central processing units by informing off-site personnel so that they may ensure corrective steps are taken.

The above plan of action is incorporated into a number of records stored on computer disk that are accessible based upon a message filtering technique. A rules file is initially accessed to analyze the content of a message received by the computer 20. This message is filtered in an attempt to create a key. If a key is formed, it is used to address a message action file instructing the computer monitoring system 10 how to respond to the receipt of such a message. If the key results in a match in the message action file, the message action file causes one of four message action options 60, 62, 64, 66 of FIG. 4 to take place. If no correspondence is found, however, between a key generated by the rules file and a message action stored in the message action file, a next subsequent rule in the rule file is used in an attempt to create a key.

Figure 5:
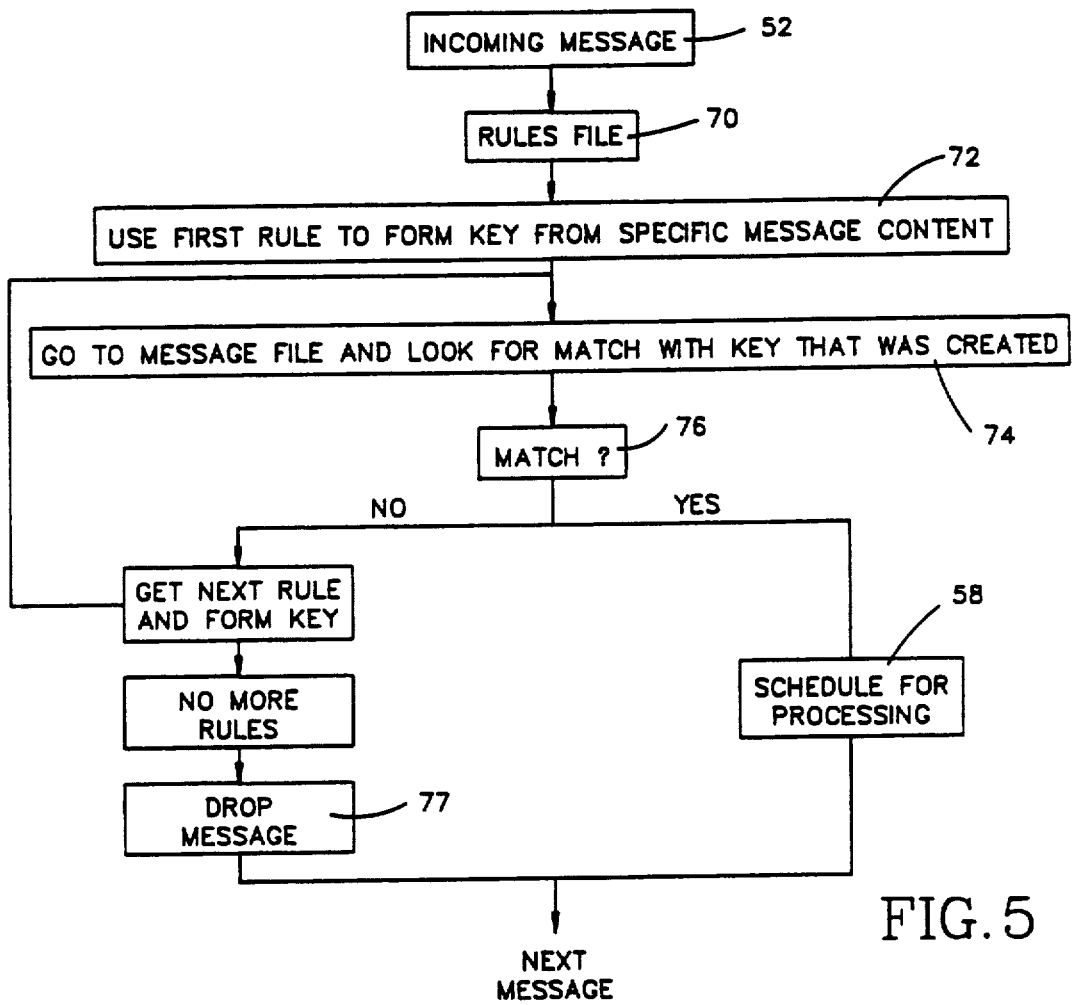

The method steps of accessing the rules file 70 using the rule to form a key 72, and subsequently using that key to analyze a message action file 74 are depicted in FIG. 5. Once all rules have been used in an effort to generate a key, and no successful key has been found, the message is dropped 77 from the system. A correspondence or match 76 between the key and a record in the message action file, however, causes action processing to occur in a user definable manner.

The message action file may, as an example, cause the computer 20 to report receipt of a message corresponding to a failed CPU on the screen, update the graphics display of the system, and make an announcement of a central processing unit failure. This would also cause a status record within the microcomputer 20 to be updated indicating a single central processing unit had failed. Upon receipt of a second such message indicating two CPUs have failed, the message action file would again initiate loudspeaker announcement of such failure, update the screen and also update the status record. In this event, however, the status record now has reached a threshold value which causes the microcomputer 20 to take other steps. Specifically, the telephone numbers of all individuals to receive notification of two or more central processing unit failures are called using a voice library containing pre-programmed messages.

Messages may also be received upon the successful correction of a problem. The status file has a current indicator regarding the status of the computers 14 that are being monitored and the so-called tally of a specific event can therefore also drop below its threshold.

Key Specifications (KeySpecs)

Based upon the message received via the communications input 14 or generated internally by the microcomputer 20, the message processing portion of the invention forms a collection of characters referred to as a key and uses this key to access or address one or more file records. The user defines the key specification used in defining the key as well as the file records pointed to once the key is formed. By way of a specific example, the rules file contains key specifications used in extracting or parsing data from a computer generated message. This data forms a key used to address a particular message action record within a message action file. The message action record in turn includes key specifications (again programmed by the user) to extract other data from the computer message and access, for example, a voice file maintained by the computer. A key specification will, if it succeeds, yield another character string, a key, that will be used to access information such as voice entities, status records, message action records, and so on.

The keyspec operates with two imaginary pointers into a buffer of characters. The keyspec defines how these pointers will be manipulated to finally position them for extraction of information. After the positioning, the system extracts characters based on the location of the 'from' and 'to' pointers.

The keyspec may be written as a combination of:

<literal> ... <substring> where literal refers to any character string enclosed in double quotes and substring refers to a specification as explained below. Any number of literals and substrings may be specified, in any order, and a key will be formed by the concatenation or string combination of the literal(s) and any string extracted by the substring(s).

The syntax of literals in key specifications is as follows:

Any character string enclosed in double quotes.
Literals enclosed in double quotes (") indicate that all characters will be treated as if they were upper case. The microcomputer 20 converts all characters to upper case as input and prior to any comparisons being made.
A number on its own does not need quotes.

The syntax of substrings in key specifications is as follows:

[<from pointer>, <to pointer>]

or (<from pointer>, <to pointer>)

where the square brackets
[ ]mean inclusive of the characters pointed to and the parentheses
( ) mean exclusive to the characters pointed to.

The substring specification tells the system how to position the 'from' and 'to' pointers and then to extract the characters, inclusive or exclusive of the characters pointed to form the key.

Prefixes may be placed in front of a substring to indicate the characters are to be extracted from a source other than an incoming message. One example is to extract characters from a status record.

For example, the key specification

"TNM" [1,3]

applied to the following message string (indicating a CPU is down)

```
040 19:30 10FEB87 001,01,031 PROCESSOR 03 DOWN
 Δ   Δ
```
(1)

will extract the first three characters from the buffer (because the square brackets mean inclusive). Once the "040" is extracted from the message, it is appended to the literal "TNM" and thereby forms the key "TNM040".

The <from pointer> and <to pointer> can be entered in the following ways:

<literal strings> for example: "LDEV"
as described above. In other words:
Search the buffer for the literal string specified and position the pointer to the first character of the field.
<number> for example: [1,3]
Position the pointer to the indicated character position. Note that these are not offset pointers and therefore start at '1' (one).
+ − <n> (where n = number) for example: [1,+3]
Move the pointer left (−) or right (+) n positions.
+ − <n>*<literal>
Move the pointer right or left according to the $n^{th}$ occurrence of the literal
For example:
[+3*"ABC"]
will move the pointer (to the right) at the beginning of the third occurrence of the string "ABC" in the message buffer.
+ − L
Move the pointer left or right n positions- where L is equal to the length of the preceding literal search field.
For example,
["ABC"+L]
will search for the string "ABC" and, when found, will move the pointer to the right 3 places from the "A"--that is, one space after the "C".
E for example: [E−3,+2]
Move the pointer to the end of the buffer.

File Maintenance

Figure 6:
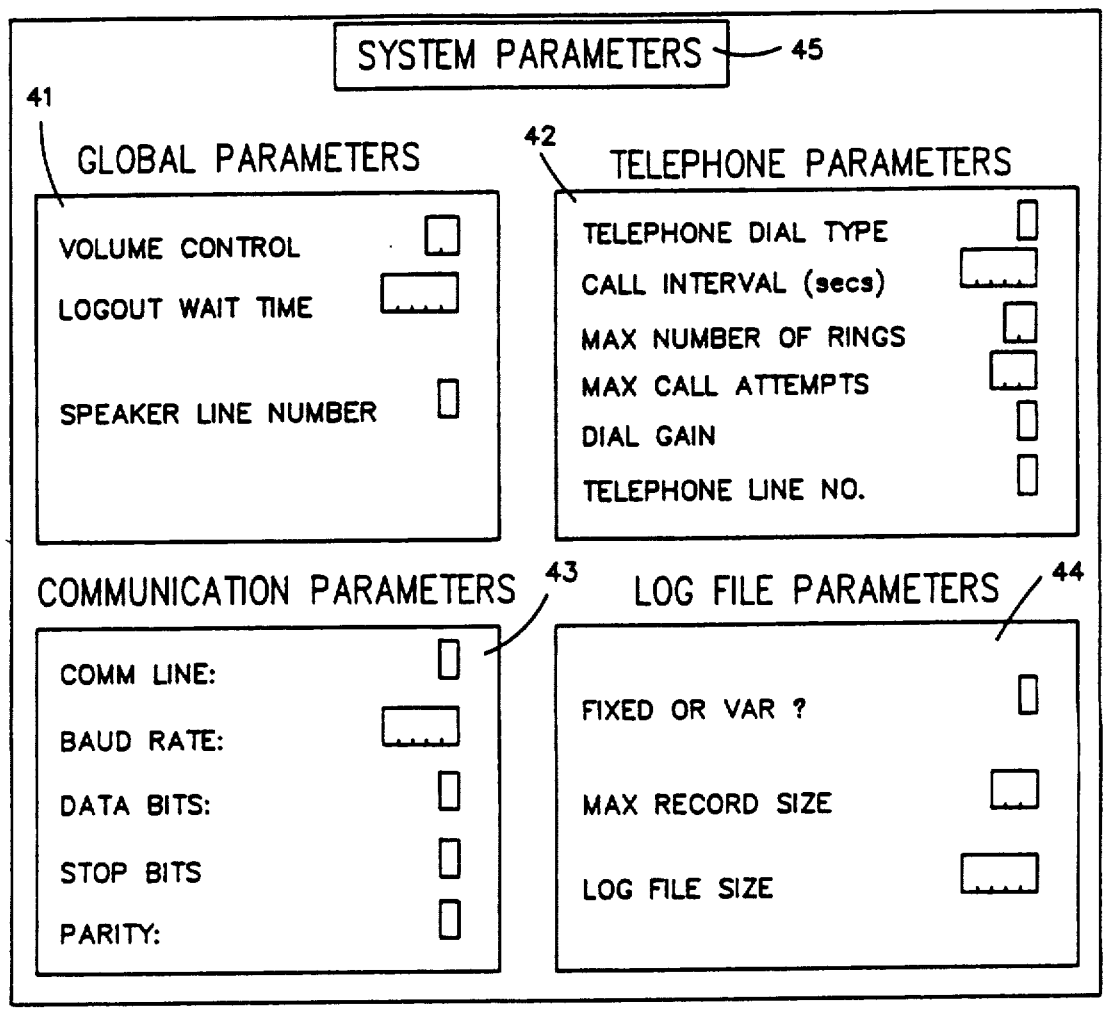
FIG. 6 is a listing of user adjustable parameters for controlling computer monitoring and response.

With the above introduction to key specifications the file maintenance capabilities of the monitoring system 10 are described below. It is recalled that from the main menu 30 (FIG. 2), the user can enter a file maintenance activity which allows the user to change communications parameters 45 (FIG. 6). He or she can also modify the message processing records 78 of the system, interact with the voice and/or graphics library 79, and modify personnel records 80 that are maintained on disk. These records are all modified using the computer keyboard. By selecting the file maintenance option from the main menu, the user is presented with four options depicted in FIG. 3.

By selecting the parameters option 45, and moving the cursor to the particular fields (FIG. 6) the user wishes to change, permanent changes can be entered to the parameters by entering a enter key after these changes have been added. The main menu can be returned to without incorporating the changes by pressing one of the computer function keys on the keyboard. It is believed many of the parameters outlined in FIG. 6 are self-explanatory. The volume control, for example, controls the output volume of voice messages generated by a voice board. The logout wait time field determines how long the user is given to acknowledge messages displayed on the active message display. The speaker line number indicates which of the four voice boards generates speaker messages. In a similar fashion, the telephone line number indicates which voice board places telephone calls to off-site personnel. The log file parameter fields relate to information used in archiving records from the fixed disk to floppy disk. The fixed or variable field indicates the record size to be used for messages as they are logged. The maximum record field defines the maximum record length used in this archiving. A default length is 132 bytes. Finally, the log file size field specifies the amount of space allocated for archiving purposes by the computer 20.

Rules File

Figure 7:
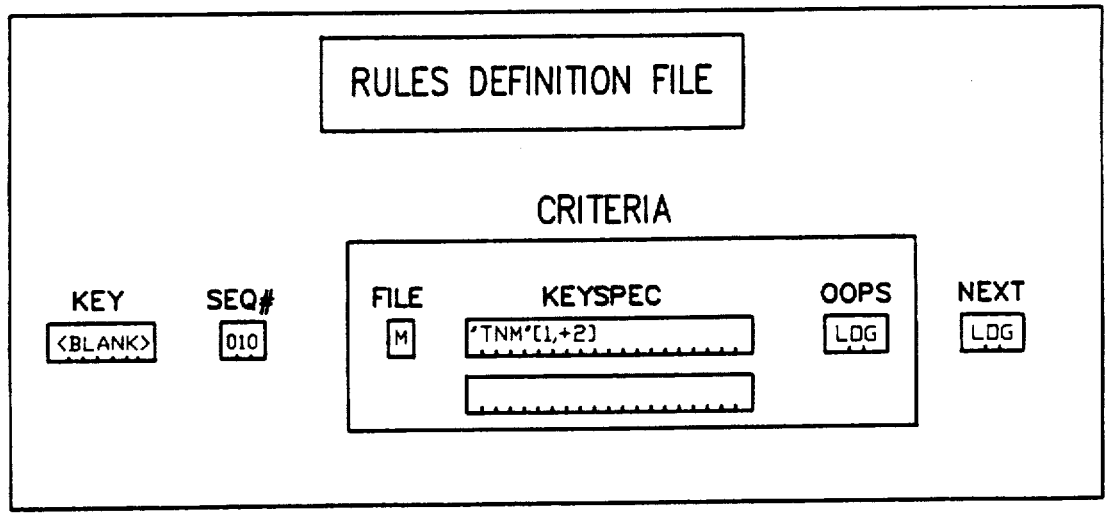

Within the message processing option 78a rules file suboption 90 can be chosen. The computer 20 displays a screen (FIG. 7) for adding, changing or deleting the rule by which it identifies and processes incoming messages from the computers 14. The various fields depicted in FIG. 7 are important for defining the way these messages are processed and are described in detail. The key field is blank (no entry) if the rule designated by the sequence number (1-3 digits) in the second field is to monitor incoming messages. A special designation is entered in this key field if the particular rule sequence number is to act on internally generated messages. The term "internal" could be used for such a key.

The criteria fields (3) and next field are associated with the sequence number designated in the sequence field. The file designation is a single byte designator telling the rule what file to access or act upon based upon the key specification associated with that rule. The file field can be blank or filled with one of four letters. The letter M indicates that the key created using the keyspec designated for the particular rule is to access the message action file (see below) This is the normal setting of the monitoring system 10 since typically, message action file processing of messages cause actions to take place. Alternate files are "D" which causes the key to access a device table file, "L" which causes the key to access a voice library file, and "R" which causes the key to access the rules file. It is seen, therefore, that a rule can create a key that accesses another rule. The device table file contains records of those devices which are being monitored that have more than one path. Recall the device need not be an actual physical device but can be a logical device.

The keyspec field contains any combination of 50 characters t define a key specification to filter either an incoming or internal message. The Oops field is a designation telling the monitoring system 10 what it should do in the event the keyspec forms a key but that key results in no match in the specified data file ("M" for example) searched with that key. A blank field in the Oops file tells the system to go to the next numbered sequence rule in the rule definition file. Up to three integers can be entered in the Oops field to cause the monitoring system to branch to a particular sequence rule. An "END" designator in this field causes the system to cease processing of the message and process the next message in the communications buffer. A LOG designation in this field causes the system 10 to merely store the incoming message and return to the next message for processing. The same entries, blank, integers, END and LOG can be entered in the "next" field. This information is accessed if the key generated by the key specification was found in the file designated in the file field. This next field describes the next rule in the rules file to use in filtering the message.

Message Action File

An alternate suboption 92 from the file maintenance menu is the choice of a screen (FIG. 8) for adding, changing or deleting message action records. This is a critical element of the monitoring system 20 and the message action files will also be described in detail. The message action screen allows the user to program all actions that the monitoring system performs once it has identified a message. The multiple fields depicted in FIG. 8 are changed by the user and all changes are permanently entered into the record by the activation of an enter key. To return to the main menu without making those changes a specific function key of the keyboard is entered. A key entry sequence is also available to allow the user to completely delete a record from the message action file without first clearing all field entries from the keyboard.

As seen in FIG. 8, the screen presented to the user has two windows 110, 112. The fields associated with the top window 110 include a key and sequence number field. These two fields combine to define one message action rule. All remaining fields on the FIG. 8 screen are associated with this combination of key and sequence numbers. The key entry is a series of characters which have been extracted from the incoming message (either external or internal) and are used to initiate a particular action based upon the contents of the remaining fields in FIG. 8. By way of example, a rule designated in the rules file (FIG. 7) can create a key using the keyspecs therein to point to a particular message action file member designated with that key. The sequence number for each action is a three-digit number and should be unique for each action to be taken corresponding to the particular key. It is important to note that typically more than one sequence number will be available for each key. In most instances, a key generated by the rules file will access multiple message action entries or records in the message action file in sequence according to sequence number.

As in the rules library, the message action file contains a File field which can be left blank or filled with one of the three characters "S", "L" or "D". These letters indicate what data file is to be accessed using the key created by the message action keyspec of the top window 110. An "S" entry indicates the system status file is to be accessed, an "L" entry indicates the voice library file is to be accessed, and a "D" indicates the device control table is to be entered. If the file field is left blank, no new records are accessed.

The keyspec field is used to specify a key from the incoming message and use this key to access the file which was specified in the file field. This is similar to the key specification noted above for the rules file.

The Oops field indicates to the microcomputer 20 what to do if a key is formed from the message but it is unsuccessful in finding that key in the specified data file. For example, if there is no matching key in the system status file (S) the monitoring system 20 can be instructed to take one of six alternate actions.

If the Oops field is blank the microcomputer 20 ignores the message action designated with this sequence number and goes to the next sequence number within the message action file. A one to three digit integer in the Oops field tells the monitoring system to go to a specified sequence number with the same key and begin message processing. The letters "RET" tells the system 20 to halt message processing and return to the rules file to process the message with another rule in the rules file. A entry "CRE" tells the system that although no key match was found in the specified data file, it should create a record. This option is used when a permanent status record is not desirable for a particular message. Thus, as an example, to track memory errors it is undesirable to set up a status record for each memory location. It is more efficient to set up a record when an error occurs. An entry "LOG" tells the system to write the message to a log file in the event a key match does not occur. The entry "END" tells the system to halt processing of this message and begin processing a next incoming message within the communications buffer.

The limit field in FIG. 8 is used to create a threshold value that will be assigned to the system status record if the key that was created using the keyspec designation is not matched in the data file specified in the file field and the "CRE" option is entered in the Oops file. This creates a status record and assigns a limit to a counter specified by the "tally" field of a status record described below.

A "Description" field in the window 110 (FIG. 8) is used for aiding the user in documenting the message action processing capabilities of the particular key. This is done for documentation purposes only and is never changed or used by the monitoring system during message processing.

A bottom window 112 (FIG. 8) has a number of other fields whose functions are now described. A first tally field entry can have the integers 0, 1, 2, or 3 entered. This field specifies which tally field counter (in a status file) is affected by a specific message action rule. Each system status record (see below) has four counters that are defined for each device. Every message that is received may increase, decrease, or set to equal the tally counter specified in this field.

A second field beneath the tally indication can contain the values +, −, =, >, <, "C", or "N". These entries specify what type of action is to be taken for the particular tally record identified via the keyspec (above). A "+" value adds to the tally, a "−" value substracts, an "=" sets the tally equal to a value (next field), less than and greater than compare the count (in the status record) and value (next field) and set the count equal to the minimum (<) or maximum (>) respectively. The "C" designator does not change the count but simply compares the count and value and takes action based upon the comparison. An "N" entry in this field does nothing to the tally count.

The value field is a entry of one to twenty-two (22) characters which can be an integer or a keyspec used to extract a number from the incoming message. This value is used to increase or decrease the tally field counter in the status record pointed to or designated by the tally field.

The contents in the window 112 are now described. An "IF" field can contain >, <, "A", "B", "Y", or "N" entries. This field is used to specify a conditional value to check between the counter field and a limit or threshold for this counter in the system status record. The monitoring system may increase the tally field for a specific system status record and then do a comparison with the limit that has been set. If the "IF" field has a greater than entry, this type of action processing is initiated by this message action rule if the transition between the tally counter and the limit changes to "equal to or greater than". The "A" and "B" entries indicate above and below the "Y" entry indicates that the action is to be taken regardless of the count and limit and the "N" entry indicates that the action is never to be taken.

The message type field can contain the entries "E", "Y", "N" or "blank" The "E" entry stands for event driven messages which are messages logged to the operating screen and deleted when a user acknowledges those messages A "Y" entry indicates the message can not be deleted by the operator and require a corresponding change of status message from the computers 14 before the message is removed from the active message display. An "N" conditional message are messages which remove a corresponding "Y" message from the message display.

The "Message Color" field and the "Draw Color" field are used to designate the colors with which the messages are displayed on the viewing screen and the color of diagrams which are drawn indicating the status of the system. The entries in this field are presented below in conjunction with a discussion of "The Diagram Record Screen".

A "SAY" field is used to store up to 102 characters which designate a string of voice library messages. These messages are output over the speaker or telephone when the message action rule is triggered and the conditional requirement in the "IF" field has been met. The string can either h=a number or a literal string imbedded in quotes. This entry is in fact another keyspec and can be used to extract data from an incoming message. Literals in the keyspec are identified within the voice library in a manner exactly analogous to the way keys are extracted from a keyspec.

The "On Speaker" field contains either a "Y" or an "N". A "Y" indicates that the system is to announce the message over the speaker and an "N" indicates no such announcement should be made.

The "Repeat" field can contain one to four integers and specifies the time in seconds between announcements. This takes place until the operator acknowledges receipt of the message A zero entry in this field causes the monitoring system to announce the message only once.

The "Delay" field indicates the time in seconds that the system will wait before initiating any voice or telephone action based upon an incoming message. Such an entry would h=useful when a situation is sensed, a message is generated, but corrective action is taken by the computer system 11 to resolve the problem in a matter of seconds.

A "Call After" field contains one to four integers and instructs the system to begin telephone action after this delay. A zero in this field indicates that telephone action is to be taken immediately.

A "Group" field in the window 112 can contain from one to twenty-two (22) characters and any combination of literal strings or sub-strings. This field is used to specify a call group depending upon the variable data found in the incoming message. When enclosed in double quotes the group entry is a constant indicating a specific group is to be called.

A "Next" field contains one to three integers, a blank or the three character entry "RET", "LOG", or "END". This field specifies what to do if the "IF" condition (above) has been satisfied and it is completed the action required by this message action rule. A blank field causes the system to proceed to the next sequence number in the message action rule file. The integers specify a particular sequence number having the same key. This causes the system to go to the particular designated number. This sequence number must exist in the message action file. A "RET" entry tells the system to suspend message action processing of this message and begin processing a next message in the buffer. A "LOG" entry causes the system to log the message to a log file and proceed with the next message. An "END"

entry causes the system to suspend processing of that message and proceed to a next incoming message.

The "ELSE" field can be filled with integers, "RET", "LOG", or "END" This specifies what the system is to do if the conditional "IF" field is not met. The entries in this field have exactly the same as entries in the Next field (above).

Status Records

The monitoring system 10 maintains a number of status records accessed by the status file screen 94 which are added, changed, or deleted using the FIG. 9 screen. All entities (both physical and logical) have a unique status record. The key field identifies the entity and uses from one to sixteen characters to do so. The alternate key field is used to create an alternate identifier for an entity.

The type field "Typ" (FIG. 9) can be blank or contains an "S" for synonym. An S entry causes the system to update the status record addressed by the alternate key field.

The "Description" field is used for reference and identification purposes and is not used by the monitoring system during message processing.

The "tally" fields (0-3) contain a description of the tally, the present count of the tally, and a limit or threshold for the tally. The "Force" field is used to override a conditional comparison in a message action file.

The "PLAY" and "RECORD" fields cannot be changed. The "PLAY" field allows the user to enter the status record screen and play a message associated with the key for this entity. The "RECORD" field allows the user to record a new voice message to associate with the key for this entity.

One example of a status record would be a record containing the number of CPUs that are "Down." This will enable the microcomputer 20 to announce and initiate phone calls when more than two CPUs are down.

Device Control Table

The device control table (FIG. 10) is used to create multiple path designations for a device. The "Device" field contains from 1 to 10 characters and is used to create a unique key for a piece of equipment with more than one path. This key is used by the rules file and message action file to identify specific devices and paths to that device. The path designations for that device are contained in the "Device Designation" field.

The Voice Library

The computer 20 maintains a pool of digital voice message 'pieces' in a voice library. Each member in this library has a unique identifier and digital voice data associated with it. The voice data may be an entire message, a phrase, a word or simply a letter. Sentences are constructed in real time by the message action file selecting library members and concatenating them into one or more sentences.

To create the library the computer 20 digitizes analog human sound from the microphone and compresses the resulting bit stream according to a specified byte rate. The system uses a rate of 2500 bytes per second to ensure a good quality of recording and playback. This function is provided by the Votan-2000 voice board.

If the user selects the 'Voice Librarian' option 96 from the file maintenance menu, he or she is presented the FIG. 11 screen for adding, changing or deleting voice messages.

When the screen is presented, the fields are empty. The user must enter a valid identifier in the "Library Member" field to bring the description of the voice message to the screen and to activate the 'Play' and 'Record' functions.

The "Library Member" field is used to create a unique identifier or key for this particular voice message. The member description field is used for reference purposes and typically includes a text description of the message. The play and record functions are accessed by moving the cursor to those fields and striking an enter key. The phrase "is down" can be recorded by choosing the RECORD option and speaking those words into the microphone. The Votan voice board digitizes the analog waveform and presents the digital data to the microcomputer for storage.

The Diagram Record Screen

The 'Diagram File' screen 98 (FIG. 3) can also be selected from the file maintenance menu. The computer 20 presents the screen for creating, changing or deleting the rules used in creating the graphic displays appearing on the computer monitor.

The fields in this 'Diagram Definition' screen (FIG. 2) are used to build a library of special visual symbols that immediately indicate a certain type of problem and that supplement the voice messages associated with the same problem.

The fields in this screen remain empty until both an identifier is entered in the 'Main Key' field and one of the valid sequence numbers associated with this "key" is entered in the sequence number field.

The main key field creates a unique key with which to associate one or more sequence numbers and thereby create one or more rules in the diagram file. This key will be formed by a keyspec in the message action record.

The sequence number field contains a number to associate with the 'Main Key'. The combination of the two fields represents a unique identifier for the parameters in the remaining fields and thereby forms a "rule" in the diagram file.

The "Type" field contains a "H" or "L" or "S" or "T" with a default value of "L". This field to specify the type of diagram that is drawn. The "L" option indicates a line. The "H" option indicates a box diagram. The "S" option indicates a box diagram with thin lines as borders. Tee "T" option indicates text (or words) are to be displayed.

The "Comment/Label" field serves two purposes. If the user wishes to display text in the graphics screen, a 'Type' of 'T' is entered and text placed in this field. However, if any other code than 'T' is entered in the 'Type' field, this field is used as a comment field.

The "Color" field specifies the color of the diagram (or part of the diagram) used to draw. The user can use the colors specified below either alone or in combination to create a wider spectrum. The values of the variables are as follows:

| R - for Red | I - for Intense |
|---|---|
| G - for Green | F - for Flashing |
| B - for Blue | N - for No Color |
| | (i.e., invisible) |

-continued

W - for White

Possible color mixes are:

| | |
|---|---|
| RG = Brown | IRG = Intense Yellow |
| RB = Purple | IRB = Intense Purple |
| GB = Cyan (light blue) | IGM = Intense Cyan |
| I = Grey | |

The "From" and "To" fields specify the starting and ending position of the box, text, or line.

Operator Identification Screen

When the user selects the 'Authorized Operators' suboption 100 from the file maintenance menu (FIG. 3), the computer 20 presents the screen (FIG. 13) for adding, changing or deleting the data on operators who are authorized to use the monitoring system.

This is the method of controlling access to the system. Only those operators given 'supervisor' status will have access to the system 'File Maintenance' functions (FIG. 3).

The computer 20 requires operators to identify themselves in three instances:
1. When selecting any of the administrative services from the main menu.
2. When the computer requests that a message be acknowledged.
3. When stopping the monitoring system.

The presently recognized operator types are "S" for Supervisor and "0" for Operator. Only "S" type users have access to the File Maintenance Services.

The Notification Group Screen

If the 'Notification Group' suboption 102 is selected from the file maintenance menu, a screen (FIG. 14) for adding, changing or deleting information about telephone actions is presented. This information includes whom to call, when to call and what number to call.

The keys to accessing the information in this file are the 'Group', 'Person' and the 'Alternate' fields. There may be one or more persons in a "Group" (identified with a 3 digit number) and any information displayed in the Call Window relates only to one person. The "Person" field contains that person's ID number. The "Alt" field contains an integer and is used to specify other call records for the same person. This can be used to create different records for the same person within a group for different times of the day.

If the same person is set up in different groups, with different call windows or phone numbers, the person has more than one I.D.

The "Call Window" contains a first field containing one to seven characters designating days of the week. The "From" and "To" fields contain times in hours and minutes conforming to a 24 hour clock convention. The "Phone Number" contains the phone numbers to call.

Normal Operation

The typical user of the monitoring system 10 is an operator and does not have access to the multiple screens disclosed in FIGS. 7-14. This user is presented with either of two screens, a first screen displays active messages and can be scrolled up and down by the user. A second screen indicates a graphic display of the monitored system, and the illustration, the multiple computers, peripherals and CPUs contained in that system. The user can toggle between the two screens by pressing one of the function keys on the keyboard. To acknowledge a message received by the monitoring system the user logs into the acknowledgment routine by entering an identification and security code and pressing an enter key. Once the user has scrolled to a particular message that is to be acknowledged a function key is entered and a time stamp created by the time process (7) indicating the time at which the message was acknowledged. Conditional messages are presented on this viewing screen until a "reverse" message is received from the monitored system. Event-type messages disappear from the screen once they are acknowledged. A particular voice message generated over the loudspeaker is typically stopped once the message generating this message has been acknowledged.

Message Action Example

FIGS. 15-19 present viewing screens depicting message action rules and status records for handling the receipt of a message indicating a CPU is down. One such message was presented above in the discussion of key specifications and is used again in analyzing the message action files of FIGS. 15 and 16. Turning briefly to FIG. 7, the rules definition file disclosed in that figure depicts a key specification (keyspec) in rules file sequence number 10 indicating the message in the buffer is to be analyzed in a way that will extract the key "TMN040". This key is an address into the message action file(indicated by the file field designator M). As indicated in FIGS. 15 and 16, two message action sequence numbers contain this key. Sequence number 10 (FIG. 15) contains a key specification for extracting a key from the input message communicating the fact that processor 3 of computer system 1 is down. This information will enter two systems status files (FIGS. 17 and 18) keeping track of CPU status and the number of down CPUs. Tallies are incremented which cause a message to be audibly presented to the operator. Counter zero of the status file designated by the key 001,03 (FIG. 17) will be incremented and an audible message indicating "processor number 3 on system 1 is down" is announced on the speaker. This will be repeated every 30 seconds until an acknowledgment is made by the operator of receipt of this message. This message will also be presented (in red) on the screen in the active message list and the system status indicator in the graphic screen will be updated with a flashing red symbol.

Once the message action defined in FIG. 15 has completed, a subsequence number (FIG. 16) is accessed for a determination whether a phone contact should be made. When only one CPU has failed, the FIG. 16 message action rule accesses the second (FIG. 18) status file and determines that only one CPU is down. The warning message indicated in the say field of this message action file will therefore not be accessed for presentation to the voice boards A next computer generated message indicating a down processor is presented below:

```
040 22:10 10FEB.87 001,01,031 PROCESSOR 02
    DOWN
```

Upon receipt of this second message indicating a different CPU (02) has failed, the two message action records defined in FIG. 15 and 16 will again be accessed. Sequence number 10 will announce the fact that a second processor has failed by announcing its process number and system number. In addition, however, the system status file in FIG. 18 will be incremented above its limit and the comparison to determine if telephone warnings are necessary is conducted, a affirmative indication will be received and those users designated in the group "Operations" will be contacted and receive the warning message that two CPUs are now down. Thus, the monitoring system 10 has presented a warning both to the system operator as well as off-site users that corrective procedures must be taken since a threshold value of processing units CPUs have failed.

Source Code for a Representative Process

Appendix A to the specification lists a source code listing in the "C" language for implementing the communications process (4) for monitoring receipt of messages and analyzing those messages in accordance with the key specification filtering technique. This source codes listing is representative of one possible implementation of the invention. Skilled programmers familiar with multi-tasking systems as outlined in the "Voice Applications" reference will understand that alternate mechanisms for implementing the communications process are possible. The commproc () sub-routine contains an algorithm for checking an input buffer and comparing the pointer of the most recently processed message with a pointer pointing to the most recently received message. If the two are unequal, the commproc () function sends a pointer to this message to a function designated mproc() (Message Processor) also listed in Appendix A. The mproc() routine handles message processing for both rules and messages and has two arguments; a pointer to a string designating the message processing key and a pointer to the message under scrutiny. The mproc() function accesses a copy function copy (x,y,z) for performing a string copy and then accesses fields in the message action file which are arranged as structures and elements within those structures. The Myfile designator indicates an array of such structures which are loaded from disk upon system initialization. The mproc() routine copies these fields and then accesses a search algorithm to match the key passed to the mproc() function with entries in the various records (status record, for example) contained in the structure array.

A string builder function, sb(), is also accessed by mproc (). The string builder is handed a keyspec and generates a key. The string builder function is given a pointer (memory location) to put its key, a maximum number of bytes for the key, where to access the keyspec (another pointer), and finally the source of the strings the string builder function filters with the keyspec. The first of these sources is the communications message buffer. It should be emphasized, that the filtering techniques contained in the source code listing of Appendix A are representative and are in no way intended to limit the scope of the invention.

It is appreciated that the present invention has been described with a degree of particularity, but that this illustration is not intended to limit the scope of the invention. It is therefore the intent that the invention include all modifications and alterations falling within the spirit or scope of the appended claims.

APPENDIX A

```
/**
    ASNCOM    -      COMMUNICATION PROCESS

Copyright (c) 1986, 1987 Votek Systems, Inc.

*/ include "tic.h"

ommproc()                                    /* ASYNCHRONOUS COMMUNICATIONS */ int i,j,c,nqueued;
    char *buf;

static int parity,format,nbr,nparity,nformat;

nbr = (int)384 / (*PAR_baud/(int)300);
    nparity = (*PAR_parity=='N') ?0 : ((*PAR_parity=='O') ?1 : 3);
    nformat = (*PAR_bits-5) + 4*(*PAR_stops-1);

if ((nbr!=br) or (nparity!=parity) or (nformat!=format))
    {  br = nbr;
       parity = nparity;
       format = nformat;
       comminit(*PAR_com, br, 8*parity + format);
    } if (V.b_buf == 0) c_init(31);
```

```
/* WAIT FOR AN INCOMING MESSAGE */
ctxcli();        /* DISABLE INTERRUPTS */ nqueued = (V.b_nxti - V.b_nxta);

if (nqueued == 0)
{  if ((V.b_nxti != -1) and  (V.d_dvptr == &V.b_buf[256*(1+V.b_nxti)]))
   {  V.b_nxti = V.b_nxta = -1;
      V.b_nxbi = V.b_nxba = -1;
      V.d_dvptr = V.b_buf;
   }
   PP_wait(WT_DELAY, 1);
   return(0);
}

MAXCBUF = max(MAXCBUF, nqueued);

/* HURRAY (I THINK)...WE GOT A MESSAGE */
ctxsti();
V.b_nxba += 1;
V.b_nxta += 1;
if (V.b_nxba >= V.b_size) V.b_nxba = 0;
lasttime = now;     /* MARK THIS TIME */

/* START PROCESSING THIS MESSAGE - BLANK RULE KEY */
buf = &V.b_buf[256*V.b_nxba];
for (i=0,j=0; ;i++)
{  c = toupper(buf[i]);
   if ((c >= ' ')  or  (c==0))
      if ((buf[j++]=c) == 0) break;
}
mproc("         ", buf);

/**
    TICMSG    -        MESSAGE PROCESSOR

**/ include "tic.h"

/*    THIS ROUTINE EXECUTES A SET OF RULES/MSG's ON A MESSAGE
      (CALLED BY COMMPROC AND TIMEPROC)      */ mproc(rule, curmsg)
 char *rule, *curmsg;
{
   int Afile,value,tally,oldcmp,newcmp,cond,c,pt,sp,j,forceoops;
   int curlevel,curfile,stk_file[10];
   double curactid;
   static double lastamt;
   char *AF,*AKS,*AOOPS;
   char sval[11], stk_key[10][10], stk_seq[10][3],NEXT[3], mprocstamp[21];
   char trace[80];
   char saveid[16];

/* INITIALIZE THE STACKS */
   curlevel = 0;
   curactid = 0;
   copy(RUL_id, rule, 10);
   copy(stk_key[curlevel], rule, 10);
   copy(stk_seq[curlevel], "   ", 3);
```

```
stk_file[curlevel] = RUL;
copy(NEXT, "   ", 3);
memset(mprocstamp, ' ', 20);
mprocstamp[20] = 0;

/* 12DEC86 */ pt = strlen(curmsg);
curmsg[pt]=' ';
curmsg[pt+1]='\0';
pt = 0;

TICMSG    -      MESSAGE PROCESSOR while (curlevel >= 0)
{  PP_wait(WT_DELAY, -1);
   if (stccmp(NEXT, "LOG", 3)==0)
   {  logit(nowstamp, stk_seq[0], curmsg);
      break;
   }
   if (stccmp(NEXT, "END", 3)==0)
      break;
   if (stccmp(NEXT, "RET", 3)==0)
   {  curlevel -= 1;
      copy(NEXT, "   ", 3);
      continue;
   }
   curfile = stk_file[curlevel];
   copy(MYfile[curfile].field[1], stk_key[curlevel],10);
   copy(MYfile[curfile].field[2], stk_seq[curlevel], 3);
   if (NEXT[0] >= '0' and NEXT[0] <= '9')
      copy(MYfile[curfile].field[2], NEXT, 3);
   if (PP_search(curfile, 0, 0) == EQUAL)
      PP_getn(curfile, 0, 0);

if (stccmp(NEXT, "   ", 3)==0)
   {  if (PP_getn(curfile, 0, 1) != EQUAL)
      {  curlevel -= 1;
         continue;
      }
   }

/* READY TO PROCES A RECORD */ copy(stk_seq[curlevel], MYfile[curfile].field[2], 3);

/* PROCESS ACTION FIELDS */
   AF   = MYfile[curfile].field[3];
   AKS  = MYfile[curfile].field[4];
   ADOPS= MYfile[curfile].field[5];

/* CONVERT CHARACTER IN 'FILE' FIELD TO NUMERIC FILE ID */
   for (Afile=0; Afile<DRW; Afile++)
      if (AF[0]==" RMSDL"[Afile]) break;

TICMSG    -      MESSAGE PROCESSOR

/* quick fix for blank in AF[0] at rules level */
   if (Afile !=0)
   {
      if (Afile == STS)
         copy(saveid,STS_id,16);
      forceoops = sb(MYfile[Afile].field[1], Fitem(Afile,1,isize),
                     AKS,
```

```
                                curmsg,
                                STS_altkey,
                                DCT_descrip);
    }
    if (Afile==RUL  or  Afile==MSG)
       copy(MYfile[Afile].field[2], "   ", 3);
    if (Afile != 0)
       if (forceoops  or  (FP_search(Afile, 0, 1) != EQUAL))
       {
          if (forceoops==0 and Afile==STS and stccmp(ADOPS,"CRE",3)==0)
          {  blankrec(STS);
             strcpy(STS_descrip, "CREATED BY TIC");
             STS_tlimit[0] = *MSG_limit;
             *STS_type     = 'D';           /* MARK A DYNAMIC TALLY */
             FP_insert(STS);
          }
          /*   07NOV86  */
          else if (stccmp(ADOPS,"CRE",3)==0)
          {  if (Afile == STS)
                copy(STS_id,saveid,16);
             /* dummy up a msg record */
             *MSG_set = 'N';
             *MSG_value = 1;
             *MSG_if = 'Y';
             *MSG_speaker = 'Y';
             *MSG_repeat = 30;
             setmem(MSG_say,' ',102);
             strcpy(MSG_say,"\"KEYSPERR\"\;");
             copy(MSG_next,"LOG",3);
             *MSG_mtype = 'E';
             Afile = 0;
          } else
          {  copy(NEXT, ADOPS, 3);
             continue;
          }
       } if (Afile != 0) FP_getn(Afile, 0, 0);

if (Afile==STS and *STS_ktype=='S')
    {  copy(keysave[process], STS_id, 16);
       copy(STS_id, STS_altkey, 16);
       if (FP_search(STS,0,0)!=EQUAL)
       {  copy(STS_id, keysave[process], 16);
          FP_search(STS,0,0);
       }
       FP_getn(STS,0,0);
    }

TICMSG    -        MESSAGE PROCESSOR if (curfile==RUL)
    {  if (Afile == 0)
       {  copy(NEXT, ADOPS, 3);
          continue;
       }
       curlevel += 1;
       if (curlevel > 9)
       {  logit(nowstamp, "***", curmsg);
          break;
       }
       stk_file[curlevel] = Afile;
```

```
      copy(stk_key[curlevel], MYfile[Afile].field[1],10);
      copy(stk_seq[curlevel], MYfile[Afile].field[2], 3);
      copy(NEXT, stk_seq[curlevel], 3);
      continue;
   }

/* IF A STATUS RECORD...ADJUST TALLY */
   if (curfile == MSG)
   {  sb(sval, 10, MSG_value, curmsg, STS_altkey, DCT_descrip);
      value = atoi(sval);
      tally = *MSG_tally;

oldcmp = (STS_tcount[tally] - STS_tlimit[tally]);

switch(*MSG_set)
      {  case '=':
            STS_tcount[tally] = value;
            break;
         case '+':
            STS_tcount[tally] += value;
            break;
         case '-':
            STS_tcount[tally] -= value;
            break;
         case '<':
            if (value < STS_tcount[tally])
               STS_tcount[tally] = value;
            break;
         case '>':
            if (value > STS_tcount[tally])
               STS_tcount[tally] = value;
            break;
      } newcmp = (STS_tcount[tally]-STS_tlimit[tally]);

if (*MSG_set == 'C')
         newcmp = (STS_tcount[tally] - value);
      /*  07NOV86
          watch this guy he'll corrupt the status file
          if you're not careful
      */
      else if (*MSG_set != 'N' and Afile == STS)
         PF_update(STS);

ICMSG   -      MESSAGE PROCESSOR

/* SET CONDITION FOR THIS TALLY */
      if (STS_tforce(tally)[0]!=' ')
      {
         switch(STS_tforce(tally)[0])
         {  case 'A':
               cond = (newcmp>0);
               break;
            case 'B':
               cond = (newcmp<0);
               break;
            case '>':
               cond = (newcmp>=0 and oldcmp<0);
               break;
            case '<':
               cond = (newcmp<0 and oldcmp>=0);
               break;
```

```
                        case 'Y':
                            cond=1;
                            break;
                        case 'N':
                            cond=0;
                            break;
                    }
            }
            else
            {
                switch (*MSG_if)
                {   case 'A':
                        cond = (newcmp>0);
                        break;
                    case 'B':
                        cond = (newcmp<0);
                        break;
                    case '>':
                        cond = (newcmp>=0 and oldcmp<0);
                        break;
                    case '<':
                        cond = (newcmp<0 and oldcmp>=0);
                        break;
                    case 'Y':
                        cond = 1;
                        break;
                    case 'N':
                        cond = 0;
                        break;
                }
            }

TICMSG    -      MESSAGE PROCESSOR

/* IF-THEN-ELSE PROCESSING */ if (cond)
    {   *AMT_type = 'C';
        AMT_msgid[0] = 0;
        copy(mprocstamp, nowstamp, 20);
        if (lastamt != now) ACTSEQ = 0;
        curactid = ACTSEQ++;
        lastamt = now;
        copy(&mprocstamp[15], format(&curactid,'N',"0",5),5);

switch (*MSG_mtype)
        {   case 'E':
                *AMT_type = 'E';
            case 'Y':
                strcpy(AMT_msgid, mprocstamp);
                *AMT_ackrepeat = *MSG_ackrpt;
                setmem(AMT_ackid, 20, ' ');
                AMT_ackid[20] = 0;
                setmem(AMT_message, 132, ' ');
                strcpy(AMT_message, curmsg);
                copy(AMT_specolor, MSG_specolor, 4);
                blankpad(AMT_message, 132);
                if (STS_msgid(tally)[0] != ' ')
                    *AMT_type = 'E';
                strcpy(AMT_name, STS_id);
                *AMT_tally = tally;
                PP_insert(AMT);
                sprintf(trace, "%s %s>%s %s>%s %d(%d.%c.%d)\0",
                        RUL_id,RUL_seqnum,MSG_id,MSG_seqnum,STS_id,tally,
```

```
                    STS_tcount[tally],*MSG_if,STS_tlimit[tally]);
        logit(mprocstamp, (*AMT_type=='E')?" E:":" C:", trace);
        if (INTIC == 'L')
            pf_window(AMF,0,INIT+PAINT+LPAGE);
        if (*AMT_type == 'E')
            break;
        copy(STS_msgid(tally), mprocstamp, 20);
        PF_update(STS);
        break;
     case 'N':
        if (STS_msgid(tally)[0] != ' ')
        {  copy(AMT_msgid, STS_msgid(tally), 20);
           if (PF_search(AMT,0,0)==EQUAL)
           {  PF_getn(AMT,0,0);
              delactive("REV", "");
              if (INTIC == 'L')
                  pf_window(AMF,0,INIT+PAINT+LPAGE);
           }
           REFSCR = 1;
           setmem(STS_msgid(tally),20,' ');
           PF_update(STS);
        }
    }
```

TICMSG  -   MESSAGE PROCESSOR

```
    /* ADJUST COLOR IF NECESSARY */
    if (stccmp(MSG_dcolour,"    ",4))
    {   if (STS_altkey[0]==' ')
            copy(DRW_id, STS_id, 16);
        else
            copy(DRW_id, STS_altkey, 16);
        if (PF_search(DRW,0,1)==EQUAL)
        {  while (PF_getn(DRW,0,1)==EQUAL)
           {  copy(DRW_colour,MSG_dcolour,4);
              PF_update(DRW);
           }
           if (STS_altkey[0]==' ')
              paint(STS_id);
           else
              paint(STS_altkey);
        }
    }
```

TICMSG  -   MESSAGE PROCESSOR

```
    /* DO SPEAKER ACTION IF NECESSARY */
    if (*MSG_speaker=='Y' or (*MSG_callgroup & ~' ') != 0)
    {  if (*MSG_mtype != 'Y')
           *MSG_ackrpt = 0;
       PF_move(VMT, MSG);
       copy(VMT_msgid, mprocstamp, 20);
       *VMT_date = pfdate;
       *VMT_time = pftime + (*MSG_delay/2);
       *VMT_said = 0;      /* V1.05c */
       if (*VMT_time > 43200.0)
       {  *VMT_time -= 43200.0;
          *VMT_date += 1;
       }
       zero((char *)VMT_say, 102);
       for (pt=0,sp=0; ;pt++)
       {  pt += sb(LIB_id, 16, &MSG_say[pt], curmsg, STS_altkey,
                   DCT_descrip);
          if (stccmp(LIB_id, bfill, 16)==0)
```

```
            break;
        if (PP_search(LIB,0,0)==EQUAL)
        { PP_getn(LIB,0,0);
            VMT_say[sp++] = *LIB_member;
        }
        else
            for (j=0; ((c=LIB_id[j]) & ~' ')!=0; j++)
                VMT_say[sp++] = c;
    }
    sb(GRF_id, 10, MSG_callgroup, curmsg, STS_altkey,
        DCT_descrip);
    copy(VMT_callgrp, GRF_id, 10);
    for (j=0; j<4; j++)
    {   copy(VMT_person, "      ", 6);
        if (MSG_speaker[j] != ' ')
        {  *VMT_speaker = MSG_speaker[j];
           PF_insert(VMT);
        }
    }
    if (GRF_id[0] != ' ' and *VMT_when==0)
    {  if (PF_search(GRF,0,1)==EQUAL)
       {  *VMT_date = pfdate;
          *VMT_time = pftime;
          while(PF_getn(GRF,0,1)==EQUAL)
          {  copy(VMT_person, GRP_person, 6);
             PF_insert(VMT);
          }
       }
    }
    }
    copy(NEXT, MSG_next, 3);
    }
    else
    {   copy(NEXT, MSG_else, 3);
    }
  }
}
return(0);
}
```

We claim:

1. A monitoring system comprising:

a) communications interface means for receiving computer generated digital communications messages caused by an event that has occurred in a computer system including one or more computers, where each communications message comprises a sequence of characters organized in a message format dependent on the computer system that conveys the nature of the event to a user;

b) programmable message action storage means for categorizing monitoring system responses to the events occurring within the computer system as indicated by said digital communications messages;

c) programmable message filtering means for interpreting the content of received messages to categorize each received message based upon a message format dependent user defined classification criteria and to derive a key into the message action storage means corresponding to one or more monitoring system responses;

d) input means for programming the programmable message action storage means and the programmable message filtering means to allow the user to customize a response to incoming messages from the computer system based upon the message format of messages originating from the computer system;

e) visual display means for displaying a sequence of characters based upon said communications messages on a display screen; and f) alert means for apprising a user that one or more messages satisfying one of the user defined classification criteria have been received at the communications interface by implementing one or more monitoring system responses designated by the key;

said alert means including:

i) voice processor means for generating an audible voice warning message;

ii) means for displaying a visual warning message on the display screen; and iii) communications means for transmitting a voice warning message to a remote site on a communications path.

2. The monitoring system of claim 1 further comprising message tally means for storing instances of specific messages and the alert means comprises means for enunciating an audible message when the number of said specific messages exceed a threshold value.

3. The monitoring system of claim 1 wherein the message filtering means comprises:

means for storing one or more criteria for categorizing each message;

means for storing the sequence of characters that form a message upon receipt at the communications interface means; and means for examining the sequence of characters that form the message to determine if the criteria has been satisfied.

The monitoring system of claim 1 wherein the ıl display means comprises means for displaying a ction of the computer system and means for updat- :he depiction based upon responses stored in the age action storage means in response to the receipt ıe or more communications messages.

The monitoring system of claim 1 additionally ɔrising status storage means for storing status infor- ɔn about the computer system and wherein the means additionally comprises means for updating tatus storage means upon receipt of a digital comcations message and for displaying a depiction of itatus of the computer system derived from the s storage means.

The monitoring system of claim 1 additionally ɔrising non-volatile storage means for storing voice corresponding to a plurality of voice messages, said : data accessed by the alert means to apprise the concerning the status of the computer system.

A method for automated monitoring of messages a computer system comprising the steps of:

receiving computer generated digital communicaions messages that include a sequence of user recɔgnizable characters organized in a format to con- ⁄ey the status of a computer system from which the nessage originates and wherein the format of said :ommunications messages is dependent on the :omputer system;

ɔrganizing communications message responses on storage device and making the message responses ccessible by a key that can be derived from the ommunications messages;

iltering one, some, or all characters from a reeived message based upon the format of commuications messages received from the computer ystem to categorize said received message based pon a user defined classification criteria to derive ıe key into the storage device for determining an ppropriate response;

toring an indication of the contents of said comıunications messages; and one or more messages satisfying the user defined assification criteria have been received then perɔrming one or more of the substeps of;

generating an audible voice message;

ı displaying a visual message; and

) transmitting a voice message to a remote site on a communications path.

he method of claim 7 wherein the storing step a tally of instances of specific messages and the d further comprises the step of comparing the ⁄ith a threshold and initiating the apprising step the tally of said specific messages equals or exthe threshold value.

he method of claim 7 wherein the displaying step ɜs the additional substep of displaying a depiction status of the computer system on a display based nessages received from the computer system.

Ⲅhe method of claim 7 comprising the additional step of storing an indication of the status of the computer system on a storage device, updating the status of the computer system based upon a key into a communications message response for updating the status of the computer system and displayed an updated depiction of the computer system on a display screen.

11. A monitoring system comprising:
a) a communications interface circuit for receiving computer generated digital communications messages that include a sequence of characters organized in a message format to apprise a user of a status of a computer system wherein the message format is dependent on the computer system;
b) a message action storage device for storing a number of monitoring system responses concerning the status of the computer system as indicated by said digital communications messages;
c) a user interface for entering the monitoring system responses into the message action storage device to customize the monitoring system response to incoming digital communications messages based upon the message format of the computer system;
d) a message processor programmable via the user interface for interpreting a character sequence of each communications message and categorizing said communications message based upon a user defined classification criteria to derive a key into the message action storage device corresponding to one or more monitoring system responses; and
e) circuitry responsive to the message processor for apprising a user that one or more messages satisfying the user defined classification criteria have been received at the communications interface by implementing one or more monitoring system responses designated by the key;

said circuitry including:
i) voice processor circuitry for generating an audible voice message;
ii) visual display circuitry for presenting a display on a visual monitor; and
iii) communications circuitry for transmitting a voice message to a remote site on a voice grade communications path.

12. A method for monitoring messages from a computer system including one or more computers comprising the steps of:
a) receiving computer generated digital communications messages that include a sequence of user recognizable characters organized in a message format to indicate a status of said computer system to the user wherein the message format is dependent on the computer system;
b) organizing responses to receipt of the communications messages on a storage device;
c) causing each received message to be filtered in a manner dependent on the format of the digital communications message to categorize received communications messages based upon a user defined classification criteria that provides a key into the storage device for determining an appropriate response to receipt of a message;
d) apprising a user that one or more messages filtered using the user defined classification criteria have provided a key that matches a response stored on the storage device, said apprising steps including:
i) generating an audible voice warning message;

ii) displaying a visual warning message; and iii) transmitting a voice warning message to a remote site on a communications path.

13. The method of claim 12 additionally comprising the step of displaying a visual indication of the computer system and the apprising step comprising the substep of updating the visual indication in response to receipt of a computer generated digital communications message.

14. A monitoring system comprising:
   a) communications interface means for receiving computer generated digital communications messages indicating a status of a computer system including one or more computers wherein the communications messages are organized in a message format dependent on the computer system;
   b) message action storage means for storing a number of monitoring system responses to the status of said computer system as indicated by said digital communications messages;
   c) status means for storing a status indication of one or more devices associated with said computer system;
   d) processing means for interpreting each received message in a user defined manner based upon the message format to derive a key for identifying one or more responses stored in the message action storage means based upon a current state of the status means and updating a status indication of said one or more devices by means of a monitoring system response; and
   e) alert means for apprising a user that one or more device thresholds stored in the status means have been reached by initiating one or more monitoring system responses;

said alert means including:
   i) voice processor means for generating an audible voice message;
   ii) visual display means for displaying a visual message; and
   iii) communications means for transmitting a voice message to a remote site on a communications path.

15. The monitoring system of claim 14 additionally comprising user interface means for changing the contents of the status means to adjust the device thresholds.

16. The monitoring system of claim 14 additionally comprising filter means for storing a criteria which determines the manner in which the processor means analyzes the received messages.

17. The monitoring system of claim 14 wherein the visual display means comprises means for displaying a depiction of components of the computer system and means for updating the depiction of the components in response to the receipt of one or more communications messages.

18. The monitoring system of claim 14 wherein the status means comprises means for storing status information about one or more physical components of the one or more computers.

19. The monitoring system of claim 14 additionally comprising non-volatile storage means for storing voice data corresponding to a plurality of voice warning messages, said voice data accessed by the status alert means to apprise the user concerning the status of the one or more computers.

20. A monitoring system comprising a computer having:
   a) a communications interface circuit for receiving computer generated digital communications signals in the form of a sequence of characters originating from one or more additional computers of a computer system;
   b) a storage device for storing message action records which indicate a number of responses to the status of the computer system as indicated by said digital communications signals and status records for storing a status of one or more devices within the computer system;
   c) a processor for filtering characters from a sequence of characters to form a key into the message action records, comparing the key with keys associated with message action records stored on the storage device and in the event of a match performing a task indicated by the message action record; and
   d) user interface means for altering the contents of the message action records stored in the storage device to customize monitoring system response to messages received via the communications interface circuit and for programming responses of the processor to receipt of a sequence of characters;
   e) alert circuitry responsive to the processor for apprising a user that one or more conditions satisfying a user defined criteria stored on the storage device have occurred by implementing one or more monitoring system responses;

said status alert circuitry including:
   i) voice processor circuitry for generating an audible voice warning message;
   ii) visual display circuitry for presenting a display on a visual monitor; and
   iii) communications circuitry for transmitting a voice warning message to a remote site on a voice grade communications path.

21. A method for automated monitoring of a status of a computer system having one or more computers comprising the steps of:
   a) receiving computer generated digital communications messages indicating a status of said computer system wherein a format of the digital communications messages is dependent on the computer system;
   b) organizing status records defining a status of one or more devices associated with the one or more computers on a storage device;
   c) organizing message action records indicating responses to received messages on a storage device;
   d) filtering each received message in a manner dependent on the format of messages originating from the computer system to derive a key for identifying an appropriate message action record for the received message;
   e) if called for by a message action record identified by the key, updating a status record and comparing the contents of the status record with a user defined threshold; and
   f) if one or more status record thresholds are reached, apprising a user by performing one or more of the sub-steps of:
   i) generating an audible voice warning message;
   ii) displaying a visual warning message; and
   iii) transmitting a voice warning message to a remote site on a communications path.

. The method of claim 21 additionally comprising step of displaying a visual indication of the one or e computers and the apprising step comprising the tep of updating the visual indication in response to receipt of a computer generated digital communications message.

* * * * *